G. FRANK & J. AUB.
PORTABLE ASH-PAN.

No. 172,563. Patented Jan. 25, 1876.

Witnesses
Wm. S. Grosvenor
Hugh Sangster

Inventors.
George Frank,
Joseph Aub.
By James Sangster
Atty.

UNITED STATES PATENT OFFICE.

GEORGE FRANK, OF BUFFALO, N. Y., AND JOSEPH AUB, OF MANSFIELD, OHIO.

IMPROVEMENT IN PORTABLE ASH-PANS.

Specification forming part of Letters Patent No. 172,563, dated January 25, 1876; application filed July 28, 1875.

*To all whom it may concern:*

Be it known that we, GEORGE FRANK, of Buffalo, in Erie county and State of New York, and JOSEPH AUB, of Mansfield, in the county of Richland and State of Ohio, have invented certain new and useful Improvements in Portable Ash Pans and Sifters, which improvements are fully set forth in the following specification, reference being had to the accompanying drawings.

The object of this invention is to provide a simple and convenient means for receiving the ashes from a stove or other grate, and inclose them so as to prevent the rising of dust while carrying out of the room or sifting; and it consists in a receptacle for receiving the ashes, a movable grate or sieve, in combination with a removable and reversible cover, which answers the double purpose of a cover and bottom.

Figure 1:
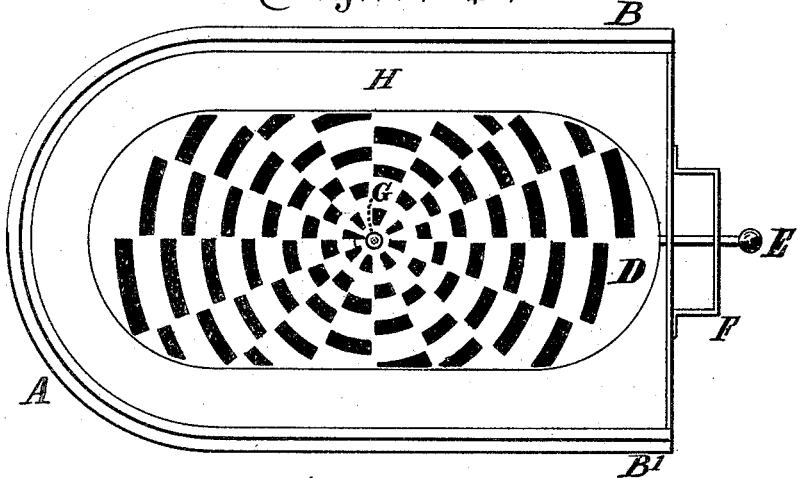
Figure 2:
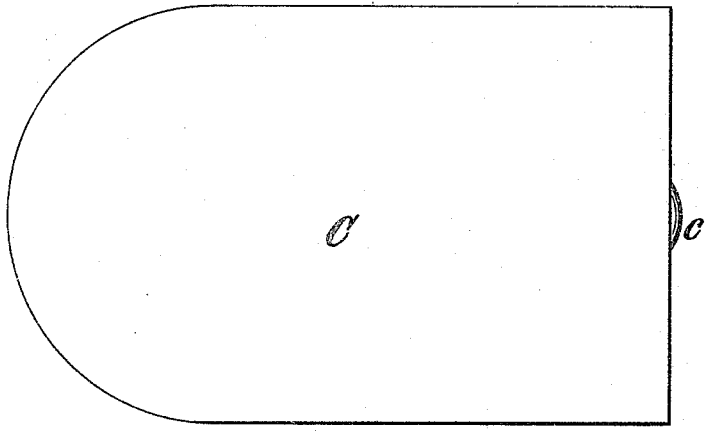

In the said drawings, Figure 1 is a top view with the cover off, so as to expose the grate or sieve. Fig. 2 represents the cover; and Fig. 3, an end view of the ash-pan complete, showing the cover arranged in place at the bottom of the same.

Figure 3:
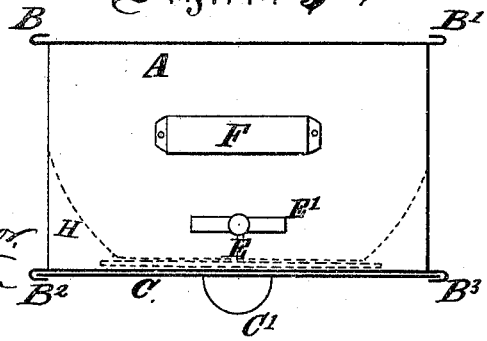

A is the ash-pan, the shape of which may be varied, so as to be adapted to any kind of stove or grate. B B$^1$ represent two grooved slideways arranged at the top for receiving the cover, and B$^2$ B$^3$ similar slideways for receiving the same at the bottom. C represents the cover. It is made to fit and slide in said grooves, as shown in Fig. 3, and fits equally as well on either side. D is the sieve or grate. It may be made of woven wire or of perforated metal, which we prefer. E represents a handle connected to the grate, and arranged so as to pass through the opening E$'$ for operating it. F is a handle for carrying the ash-pan; C$'$, a handle by which the cover C is removed or put in place.

In operation the cover C is put on at the bottom of the ash-pan below the grate, as shown in Fig. 3. It is then placed in the stove under the grate, and when filled with ashes may be taken out to be sifted, the cover having first been reversed, being carried by the handle F, like an ordinary satchel, without dropping any of the ashes. Before sifting, the cover C is reversed and put into the grooves B B$^1$ at the top. The inclined sides (shown at H in the plan view, Fig. 1, and by the dotted lines H in Fig. 3) are arranged directly over the movable grate, so as to prevent the ashes or cinders from getting at the sides and interfering with the working of the same. There is a stationary grate below the movable one, and the perforations through it should be made so that a movement sufficiently far to one side of the movable one will cause the openings to pass each other and close them, so that the ashes or cinders will not pass through.

We have shown a grate or sieve fastened to a center pin, G; but, if desired, it may be so arranged as to slide or vibrate lengthwise or crosswise, and the openings may be of any shape.

We claim as our invention—

The combination of the pan or box A, having the grooves B B$^1$ B$^2$ B$^3$, with the reversible cover C, substantially as and for the purposes described.

GEORGE FRANK.
JOSEPH AUB.

Witnesses to the signature of GEORGE FRANK:
JAMES SANGSTER,
WM. S. GROSVENOR.

Witnesses to the signature of JOSEPH AUB:
C. SHUMWAY, Jr.,
D. HUSHFIELD.